United States Patent
Butterworth et al.

(10) Patent No.: US 8,326,897 B2
(45) Date of Patent: Dec. 4, 2012

(54) APPARATUS AND METHOD FOR MANAGING DATA STORAGE

(75) Inventors: Henry Esmond Butterworth, Hampshire (GB); Ian David Judd, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 863 days.

(21) Appl. No.: 12/338,931

(22) Filed: Dec. 18, 2008

(65) Prior Publication Data
US 2009/0177857 A1 Jul. 9, 2009

(30) Foreign Application Priority Data
Dec. 19, 2007 (EP) .................................. 07150140

(51) Int. Cl.
*G06F 12/00* (2006.01)
*G06F 13/00* (2006.01)
(52) U.S. Cl. ....................... 707/822; 711/114
(58) Field of Classification Search .................. None
See application file for complete search history.

(56) References Cited

U.S. PATENT DOCUMENTS

| | | | | |
|---|---|---|---|---|
| 7,257,690 B1 * | 8/2007 | Baird | ........................... | 711/162 |
| 7,774,643 B2 * | 8/2010 | Wang | ........................... | 714/6.13 |
| 2001/0053160 A1 * | 12/2001 | Dally | ........................... | 370/535 |
| 2002/0103983 A1 * | 8/2002 | Rege et al. | ........................... | 711/162 |
| 2004/0128470 A1 * | 7/2004 | Hetzler et al. | ........................... | 711/209 |
| 2004/0148462 A1 * | 7/2004 | Uysal et al. | ........................... | 711/118 |
| 2005/0257097 A1 * | 11/2005 | Jarvis et al. | ........................... | 714/42 |

OTHER PUBLICATIONS

Authors Seunjun Shim et sl, title "An Efficient Snapshot Technique for Ext3 File System in Linux 2.6", dated 2005.*
M. Rosenblum, et al., "The Design and Implementation of a Log-Structured File System", dated Jul. 24, 1991, ACM Transactions on Computer System, Feb. 1992, [online] http://citeseerx.ist.psu.edu/viewdoc/summary?doi=10.1.1.41.8933.

* cited by examiner

*Primary Examiner* — Tarek Chbouki
(74) *Attorney, Agent, or Firm* — David W. Victor; Konrad Raynes and Victor LLP (57) ABSTRACT

An apparatus for controlling a log-structured data storage system, operable with a first log-structured data storage area for storing data, comprises a metadata storage component for controlling the first log-structured data storage area and comprising a second log-structured data storage area for storing metadata; and means for nesting the second log-structured data storage area for storing metadata within the first log-structured data storage area. The apparatus may further comprise at least a third log-structured data storage area for storing further metadata, and means for nesting the at least a third log-structured data storage area within the second log-structured data storage area.

28 Claims, 6 Drawing Sheets

APPARATUS AND METHOD FOR MANAGING DATA STORAGE

CROSS-REFERENCE TO RELATED FOREIGN APPLICATION

This application is a non-provisional application that claims priority benefits under Title 35, Unites States Code, Section 119(a)-(d) from European Patent Application entitled "APPARATUS AND METHOD FOR MANAGING DATA STORAGE" by Henry Esmond BUTTERWORTH and Ian David JUDD, having European Patent Application No. EP07150140.7, filed on Dec. 19, 2007, which patent application is incorporated herein by reference in its entirety.

FIELD OF THE INVENTION

The present invention relates to a technology for improved management of data storage, and more particularly to a technology for managing a log-structured data storage system, such as a log-structured file system or array.

BACKGROUND OF THE INVENTION

In Rosenblum et al, "The Design and Implementation of a Log Structured File System," Proceedings of the 13th ACM on Operating System Principles, October 1991, a log structured file system was proposed where modified data blocks are re-written to the disk sequentially in a log-like structure. Information (metadata) is also written with each write operation about the data being written. This metadata is used in managing the system.

Figure 1:
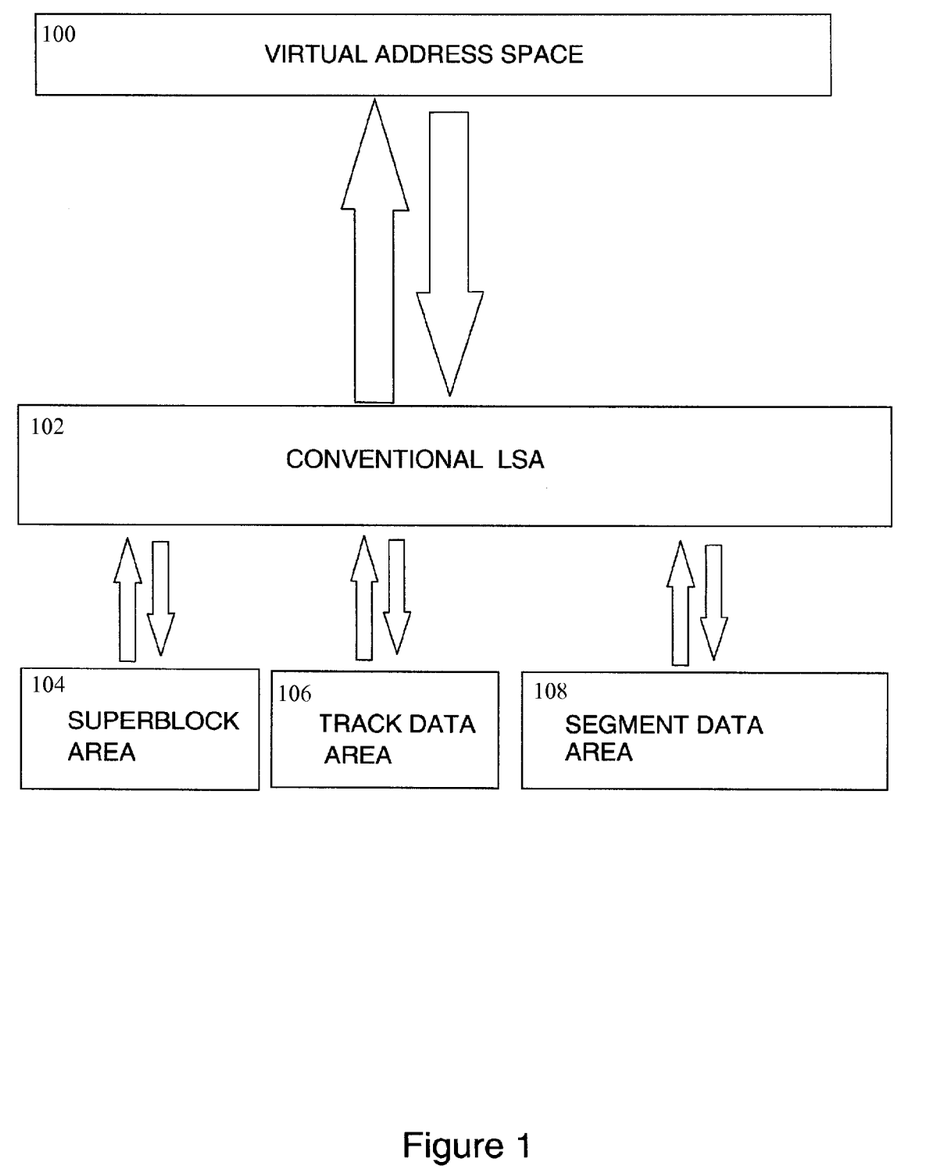
FIG. 1 shows in schematic form an LSA apparatus or arrangement according to the prior art.

The concept of log-structured file systems and arrays (LSAs) is now well-known to those of ordinary skill in the art, and need not be further described here. For the purposes of the present description, the term "LSA" will be used throughout, for the sake of brevity, but it will be understood by one of ordinary skill in the art that the term may encompass any log-structured data storage arrangement, such as an array or a file system. An example of a conventional arrangement of storage apparatus incorporating an LSA is shown in FIG. 1, in which virtual address space 100 is mapped to storage under control of conventional LSA 102. Conventional LSA 102 makes use of three data areas: superblock area 104, track data area 106 and segment data area 108. The operation of these data areas will be explained further below.

One significant problem with the management of conventional LSA is the problem of taking backups of LSA snapshots.

With a conventional LSA, it is possible to make snapshot copies of extents of a customer-visible address space such that the same data is accessible through multiple extents of the address space but only one physical copy is stored. The ability to make these snapshots has numerous benefits described in the literature. One such benefit is the ability to make a snapshot of a running system at a particular point in time and store that to backup media as a consistent point in time record of the state of the system whilst allowing the system to run on whilst the backup is in progress. Another benefit of snapshot operations is the ability to make very many copies of some information and allow multiple clients access to one copy each but only store one physical copy of the data plus any changes the clients make to their own copies. An example of the latter use of snapshot might be a service provider providing remote storage for a stateless personal computing device: the service provider could provide each new client with a snapshot of a standard volume and the client could modify its own volume as needed. The service provider would need far less storage with this approach than if it were to allocate physical storage for each client volume up front.

The problem with conventional LSA in this area is that it is not possible to make use of both of those features and take a point in time backup of data which itself contains multiple snapshot extents. In fact, taking the point-in time backup works fine but when it comes to restoring the data the information about snapshots in the backup extent is not preserved and the restored data will no longer fit on the physical storage.

A second significant problem not addressed by conventional LSA techniques is that of scalability.

With a conventional LSA, there is a two-tier LSA directory which contains metadata that maps the virtual address space seen by the client application to the physical address space presented by the underlying physical storage. In order to preserve the LSA metadata across power outages it is necessary to allocate space for it in non-volatile storage somewhere. Typically it is stored on the underlying physical storage along with the customer data.

There are valid uses of the LSA snapshot feature which require an LSA implementation to present a vast address space to the customer and the problem with a conventional two-tier directory is that in order to present a vast address space, a significantly less but not negligible amount of physical storage space must be allocated for the directory. This imposes scalability constraints because, for example, the minimum amount of physical storage the customer must buy must be at least large enough to hold the meta data for the maximum virtual address space the customer might ever want. Whilst the factor between the size of the metadata and the virtual address space is quite large (say 1000×) this is offset by the number of times the data is snapshot so for example if data was on average snapshot 1000× then the minimum configuration would have to be at least half the size of the maximum configuration in order to hold all of the metadata for the maximum configuration.

One possible approach to this problem is to allocate the metadata dynamically, for example in a b-tree, and grow the amount of physical storage allocated to metadata as the customer's requirement for virtual address space increases. This approach is valid but it introduces significant extra implementation cost to the design of a fault tolerant LSA because of the complexity of manipulating the meta-meta-data structures.

A third significant problem not addressed by conventional LSA techniques is that of the performance of snapshot over very large address spaces.

It is important that snapshot operations happen as quickly as possible because, when they are used for taking point-in-time backups, whilst they are in progress the customer application is usually suspended and this backup-window usually represents lost business for the customer.

Conventional LSA implementations with a two tier directory do a reasonable job with snapshot but again have a scalability problem because the time taken to perform a snapshot is proportional to the size of the virtual extent being snapshot whether or not that extent has been written with data. This is because the directory must be scanned entry by entry to perform the snapshot whether or not the directory entries have ever been written.

It is reasonable to imagine a small storage service provider starting with, for example, a few terabytes of physical storage with the intention of scaling to a few exabytes using a virtual address space large enough for that amount of data and for a single snapshot of it and wishing to perform nightly backups of its clients' data by taking a large snapshot at midnight and spooling it off. With a conventional LSA, there would be a few problems with this naive approach, the most significant of which would be traversing all of the unused address space which would take a long time. Of course, these problems can all be addressed with the application of knowledge and experience by the storage service provider in selecting appropriate extents to back up but the requirement for an intelligent administrator translates into higher cost of ownership and possibly lower availability (because of the potential for human error).

A fourth significant problem not addressed by conventional LSA is the problem of LSA metadata writes reducing LSA scalability and performance.

When data is written to an LSA, the metadata must be updated to reflect the new location of the data. The conventional LSA approach is to write metadata changes to a journal in fast non-volatile memory and to harden the journal periodically to a copy of the metadata stored at a fixed location on the underlying physical storage.

This approach has the problem that, when the virtual address space is vastly larger than the working set and the working set is sparsely distributed in that virtual address space, hardening the journal results in a random disk write for each customer data write and therefore eliminates LSA's advantage of collating writes into segments in the first place. This limits the scalability and usability of conventional LSA to applications which do not exhibit this kind of workload.

It would thus be desirable to have an improved technology for managing data storage, and more particularly for managing a log-structured array (LSA) storage system.

SUMMARY

The present invention accordingly provides, in a first aspect, an apparatus for controlling a log-structured data storage system, operable with a first log-structured data storage area for storing data, and comprising: a metadata storage component for controlling said first log-structured data storage area and comprising a second log-structured data storage area for storing metadata; and means for nesting said second log-structured data storage area for storing metadata within said first log-structured data storage area.

The apparatus may further comprise at least a third log-structured data storage area for storing further metadata, and means for nesting said at least a third log-structured data storage area within said second log-structured data storage area.

Preferably, unused metadata is recognisable patterned data, and said second log-structured data storage area for storing metadata is allocated on demand.

Preferably, the unused metadata comprises an all-zeroes pattern, or the unused metadata comprises an all-ones pattern.

The apparatus may further comprise a compression component for compressing said metadata before writing.

The apparatus may further comprise a snapshot component for taking a snapshot copy of said data.

Preferably, said snapshot component comprises: a divider sub-component for dividing each log-structured data storage area for storing metadata into a working half and a backup half, a first copier sub-component for copying said metadata from said working half to said backup half of each log-structured data storage area for storing metadata; a determiner sub-component for determining for a record in said backup half of each log-structured data storage area for storing metadata whether corresponding data in a log-structured data area is to be copied; and a second copier sub-component, responsive to said determining giving a positive result for said record, for copying said corresponding data.

The apparatus may further comprise a data deduplication component comprising: a hashing component for creating and storing a hash value of a data entity; a comparator for comparing hash values of a pair of data entities; a write control component responsive to an output of said comparator for selectively writing a non-duplicate data entity and for creating a snapshot of a duplicate data entity.

The apparatus may further comprise a write cache component, and said data deduplication component is operable during a cache destage.

In a second aspect, there is provided a method for controlling a log-structured data storage system, operable with a first log-structured data storage area for storing data, and comprising the steps of: controlling, by a metadata storage component, said first log-structured data storage area and providing a second log-structured data storage area for storing metadata; and nesting said second log-structured data storage area for storing metadata within said first log-structured data storage area.

The method may further comprise providing at least a third log-structured data storage area for storing further metadata, and nesting said at least a third log-structured data storage area within said second log-structured data storage area.

Preferably, unused metadata is recognisable patterned data, and comprising the further step of allocating said second log-structured data storage area for storing metadata on demand.

Preferably, the unused metadata comprises an all-zeroes pattern, or wherein the unused metadata comprises an all-ones pattern.

The method may further comprise the step of compressing said metadata before writing.

The method may further comprise taking a snapshot copy of said data.

Preferably, said taking a snapshot comprises: dividing each log-structured data storage area for storing metadata into a working half and a backup half, copying said metadata from said working half to said backup half of each log-structured data storage area for storing metadata; determining for a record in said backup half of each log-structured data storage area for storing metadata whether corresponding data in a log-structured data area is to be copied; and responsive to said determining giving a positive result for said record, copying said corresponding data.

The method may further perform steps of data deduplication comprising: creating and storing a hash value of a data entity; comparing hash values of a pair of data entities; responsive to an output of said comparator, selectively writing a non-duplicate data entity and creating a snapshot of a duplicate data entity.

The method may further comprise performing write caching, wherein said data deduplication is performed during a cache destage.

In a third aspect, there is provided a data carrier having functional data thereon, the functional data comprising functional computer data structures to, when loaded into a computer system and operated upon thereby, enable the computer system to perform all the steps of a method according to the second aspect.

In a fourth aspect, there is provided a computer program comprising computer program code to, when loaded into a computer system and executed thereon, cause the computer system to perform all the steps of a method according to the second aspect.

The preferred embodiments of the present invention thus create a new kind of LSA by nesting a conventional LSA implementation inside itself iteratively and using the LSA features such as snapshot, compression and packing writes into segments of the inner LSA instances to improve the characteristics of the new LSA as a whole. The advantages include improvements in backup, scalability, snapshot performance and in the efficiency of metadata writes.

The preferred embodiments of the present invention provide methods of implementing a Log Structured Array (or file system) using a stack of LSA-like subcomponents which have all of the benefits of LSA as described in the literature and a number of additional benefits.

Iterative LSA allows snapshot backups of extents containing snapshot information whilst preserving that snapshot information and provides the guarantee that a backup of an extent containing multiple snapshots will fit back on the physical storage when it is restored.

With iterative LSA, allocation of physical storage for metadata happens naturally on demand with very little additional design or coding effort over the conventional upfront allocation approach and it is possible to store all the metadata for a vast address space in virtually no physical storage and grow the storage subsystem from a very small amount of storage to a vast amount to meet the customer demand. As a concrete example, it would be entirely reasonable to implement an iterative LSA which presented (say) a 64 bit address space using only a single (say) 10 GB disk (or for fault tolerance, only a single array). This has the benefit that the customer has a very low entry level cost and has the potential to scale to systems as large as they are ever likely to need.

Iterative LSA is structured such that the performance of snapshot operations scales with the logarithm of the size of the extent instead of being proportional to it as for a conventional LSA. This means that there is little harm in snapshotting unused extents of the virtual address space for backups as those extents can be copied at virtually no cost and the naive strategy outlined above for backup is entirely reasonable.

Iterative LSA addresses the problem of the performance impact of metadata writes for typically random workloads because metadata writes are collated into segments in the same way that customer data writes are in conventional LSA; thus the number of disk head movements is not increased significantly by the requirement to harden the metadata.

Embodiments of the present invention, in its broadest aspect, provide apparatus and methods for managing data storage, and more particularly for managing a log-structured array (LSA) storage system.

BRIEF DESCRIPTION OF THE DRAWINGS

A preferred embodiment of the present invention will now be described, by way of example only, with reference to the accompanying drawing figures, in which.

DETAILED DESCRIPTION OF THE PREFERRED EMBODIMENTS

A preferred embodiment of the present invention will now be described, with reference to the figures. As described above, FIG. 1 depicts an arrangement or apparatus according to the prior art. This has been described above as forming the background to the present invention.

A conventional LSA as shown in FIG. 1 has underlying physical storage for some kind of superblock (call this the superblock area 104), for its metadata stored in metadata tracks (call this the track data area 106) and for the customer data stored in segments (call this the segment data area 108). Using this underlying physical storage, the LSA provides a very large virtual address space 100 which can be sparsely populated and which supports snapshot operations.

Now, the scalability problem outlined above (the "second significant problem") is that to support a very large virtual address space, the track data area has to be quite large (about 1000th as big as the virtual address space) so if a system is needed which will scale to a really large virtual address space then it is necessary to start with a very large track data area and if it is necessary to allocate it upfront then the customer has to buy storage to hold all the data. So the solution is not to allocate the track data area upfront but to allocate extents of it when they are required. This means that the track data area is not simply written to a contiguous range of sectors on disk but is stored in a data structure which will support sparse allocation on demand.

Figure 2:
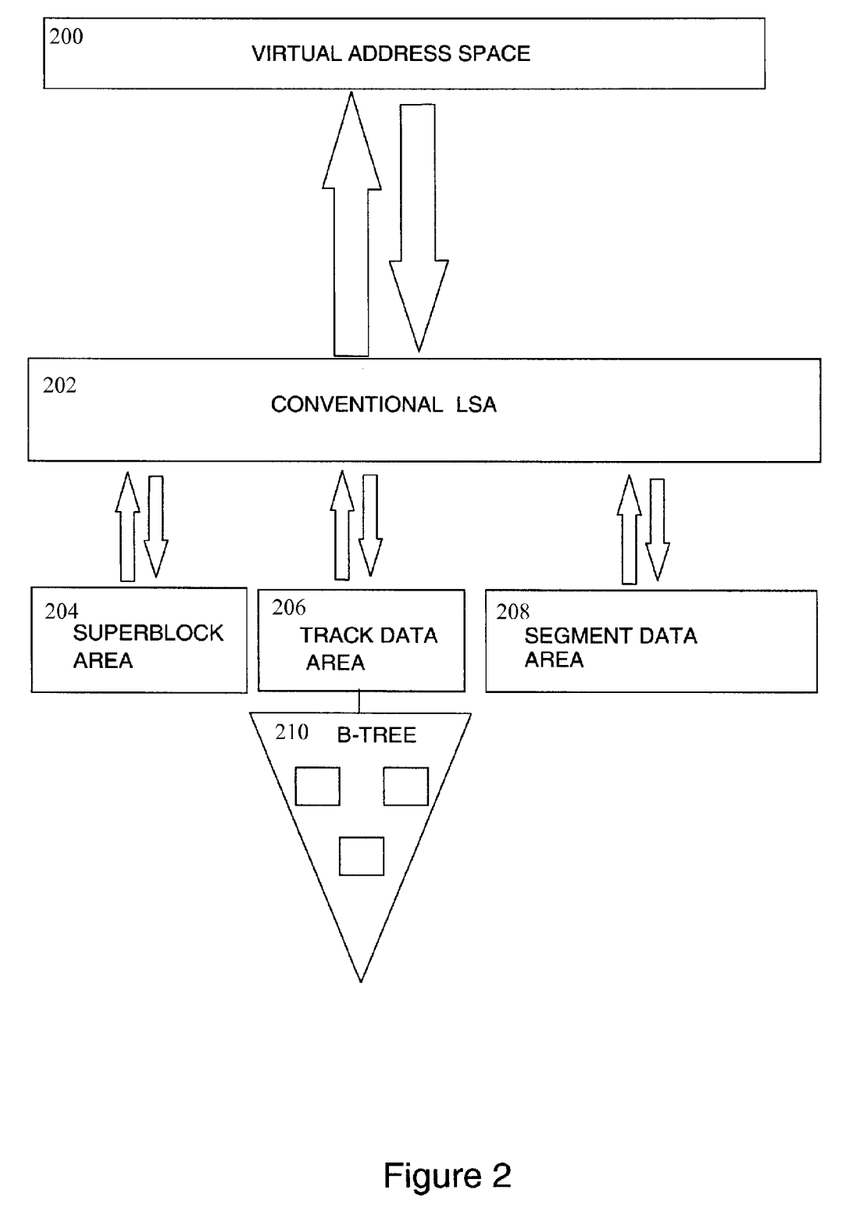
FIG. 2 shows in schematic form one possible apparatus or arrangement according to one possible improvement to the prior art.

One approach to this problem is to use a b-tree, as shown in FIG. 2. In FIG. 2, a b-tree is used to hold the track data area 210 so the track data area can be allocated on demand and thereby implement systems which can scale from very small amounts of physical storage yet still present very large virtual address spaces. The concept of b-trees is well known to those of ordinary skill in the art.

The problem with implementing the b-tree is that to do it in a fault tolerant way requires considerable design and coding effort to add to the already significant effort of implementing the conventional LSA.

Figure 3:
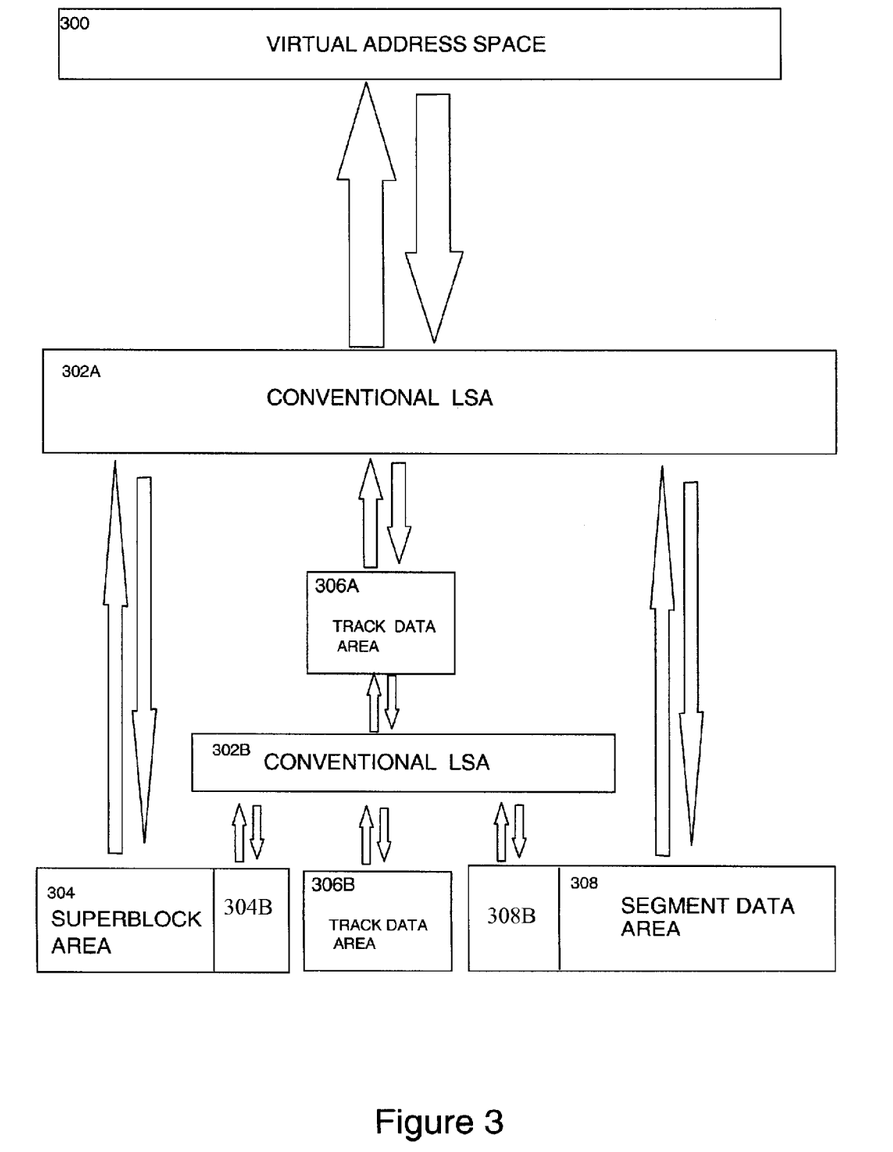
FIG. 3 shows in simplified schematic form an LSA apparatus or arrangement according to a preferred embodiment of the present invention.

In the preferred embodiment of the present invention, therefore, the b-tree solution is not adopted. Instead, the concept of an "iterative LSA" or "nested LSA" is introduced, whereby a first LSA is implemented as normal, but its control data or metadata is, in turn, stored in a second LSA nested within the first. This arrangement is shown in FIG. 3. One advantage of such an arrangement, from the point of view of an implementer of such a system, is that the essential logic arrangements or corresponding code arrangements for an LSA have already been created for the first LSA, and can thus be reused for the second LSA.

Thus, in FIG. 3 are shown two instances of an LSA 302A and 302B which share the superblock area 304 and the segment data area 308. The inner (and smaller) instance of the LSA 302B uses its share of the superblock area 304B and segment data area 308B and a small track data area 306B to provide a virtual track-data area in which the larger LSA instance can store its metadata. Now, provided the LSA is coded such that the metadata is all zeroes when it is not in use, the upper LSA 306A can present a large virtual address space and the lower LSA 306B will only allocate physical storage for the metadata for that address space when the upper LSA actually needs it. The lower LSA 306B level can allocate its metadata upfront in a simple way.

Now, as the track data area of the lower LSA instance 306B is about 1000× smaller than the track data area for the upper instance, there is a saving of about a factor of 1000 in the amount of storage space if the track data area of the lower instance is allocated upfront. 406b Further advantageously, it is possible to iterate to as many levels as necessary and, with the addition of each level, the amount of upfront storage allocation by the lowest level shrinks by a factor of about 1000.

Figure 4:
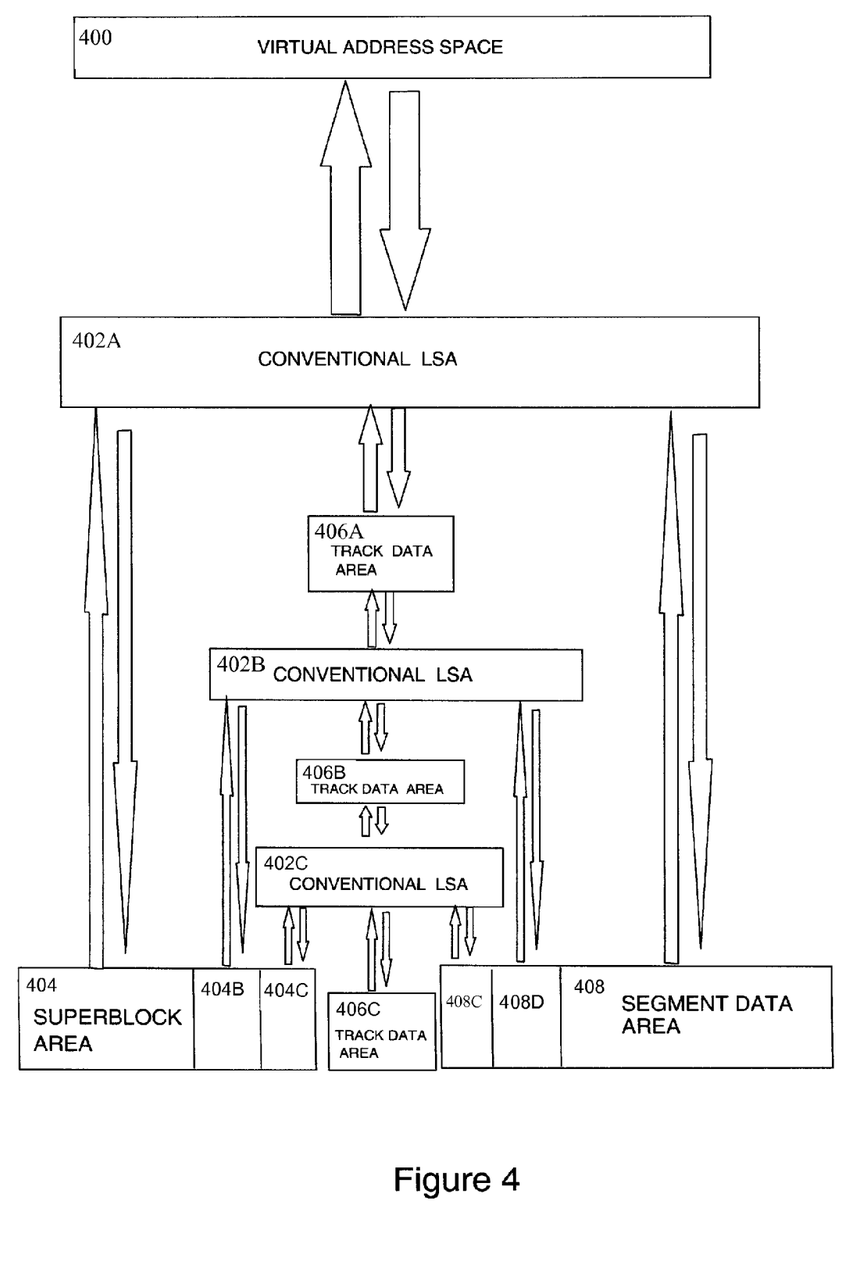
FIG. 4 shows in simplified schematic form an LSA apparatus or arrangement according to one possible further modification of a preferred embodiment of the present invention.

So, it would be possible to have three levels of LSA, as shown in FIG. 4.

In FIG. 4, there are shown three LSA instances 402A, 402B, 402C sharing the superblock area 404 and the segment data area 408. The lowest LSA instance 402C has a very small upfront allocated track data area 406C which it uses along with its share of the other areas 404C and 408C, to present a larger virtual address space in which the LSA instance 402B directly above stores its metadata, and so on for each further level.

With enough levels, it is possible to present a very large address space with only a very small upfront allocation of storage for the lowest level.

Aside from actually implementing a conventional LSA, there is one difficulty with this iterative or nested LSA architecture: that of dynamically sharing the segment data area 308 and 408 (FIGS. 3 and 4) between the LSA instances without deadlock. This can be addressed using a storage reservation strategy, as the superblock area 304 and 404 is sufficiently small that it can be allocated without the need for dynamic sharing between the LSA instances.

Figure 5:
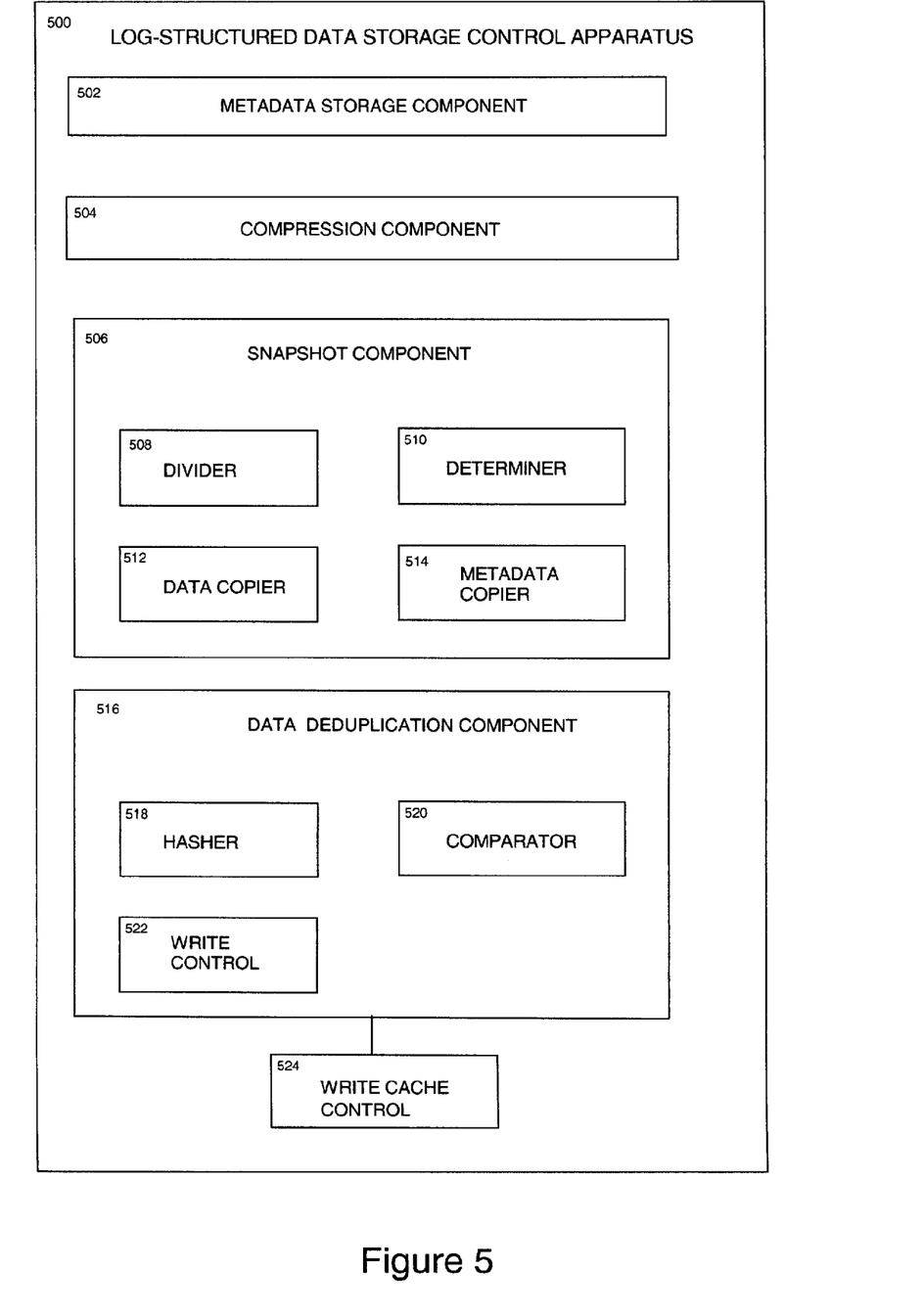
FIG. 5 shows in simplified schematic form an arrangement of components according to one embodiment of the present invention.

FIG. 5 shows in simplified schematic form a set of components according to a preferred embodiment of the present invention. Log-structured data storage control apparatus 500 comprises a metadata storage component 502, and a compression component 504. Apparatus 500 further comprises a snapshot component 506, which in turn comprises four sub-components: a divider 508, a determiner 510, a data copier 512 and a metadata copier 514. Apparatus 500 further comprises a data deduplication component 516, which in turn comprises three sub-components: hasher 518, comparator 520 and write control sub-component 522. Data deduplication component 516 is operable in communication with write cache control component 524.

The fourth problem described as part of the background discussion above was that of the performance impact of performing metadata writes. As will be clear to one of ordinary skill in the art, once the metadata itself is stored in an LSA it is automatically collated into segments and is written out with fewer disk head movements, and thus the performance problem is alleviated. In a further improvement, the metadata could also be compressed which should further improve performance.

The first problem described in the Background section above was about trying to take snapshot backups which preserved snapshot information and could be restored onto the same amount of storage as they came from In a preferred embodiment of the above-described iterative LSA architecture, this problem may be addressed by reserving half of the track data area address space of each level for backup state (this reduces the 1000 factor described above to 500 and might require the addition of another level to the multi-level LSA arrangement). Then, using the snapshot functionality of each level, it is possible to make a t0 (or point-in-time backup) which preserves snapshot relationships as follows:

1) Customer data I/O is quiesced and any cached data flushed to the LSA.
2) The working half of each track data area is snapshot copied to the backup half starting with the track data area at the lowest level and working all the way up to the virtual address space containing the customer data. This process makes a snapshot copy of the working LSA state at this time (each snapshot modifies the working state of the level below but, because the snapshots are from the bottom up, by the time it is performed the original working state of that level has already been captured).
3) Customer data I/O may be restarted. It will be possible to arrange that backup snapshots are on large power of two boundaries so the backup window should be sub-second after the customer application is stopped and the cache flushed.
4) While the customer application runs on the working copy, a process may traverse the backup state of the LSA extracting records to append to the backup image. By examining the backup copy of the metadata of the lowest level and working upwards as necessary the backup process can return the most compact set of records for describing the LSA state.
5) Records could be of three types: zero extent records indicate that an extent contains only zeroes; snapshot records indicate that an extent is a snapshot of an extent which has already been fully described; track records indicate that a track has been encountered for the first time and must be fully backed up.
6) The backup image consists of a series of these records as they are emitted by the traversal process. The traversal process might easily emit tracks which were already compressed so there would be no need for decompression and subsequent recompression before writing to the backup medium.
7) Restoration starts with a new LSA (which need not have the same underlying storage configuration as long as there is at least the same amount of storage as in the original LSA) and proceeds by replaying the backup image. Zero records are replayed by performing a discard extent operation (or whatever operation the LSA has to free up physical storage) but would only be required for incremental backups as a new LSA would already be zeroed. Snapshot records are replayed by performing the snapshot and track records by writing the track.

Incremental backups can be performed by preventing the traversal process from emitting records which are dated before the time of the last backup (date information might be stored as a sequence number in every segment which would almost certainly be required for other reasons anyway).

Figure 6:
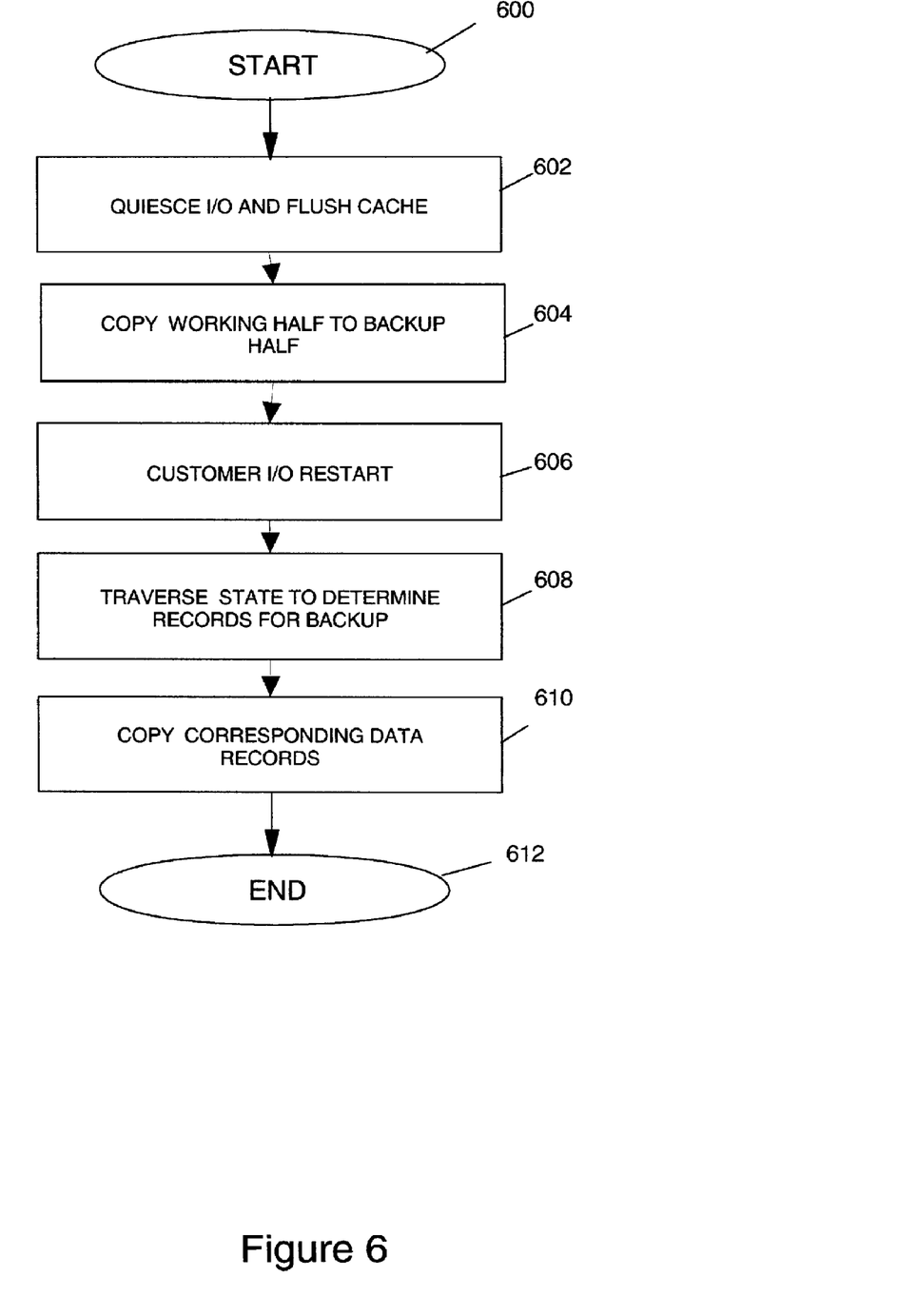
FIG. 6 shows in flowchart form, the steps of a method of taking a point-in-time backup copy according to a preferred embodiment of the present invention.

FIG. 6 shows in flowchart form the steps of a method of taking a point-in-time backup of data according to one embodiment of the present invention. At START step 600, the process begins, and at step 602, customer data I/O is quiesced and the cache is flushed. The working half of the track data area is copied to the backup half at step 604. At step 606, customer data I/O may be restarted. At step 608, a background process traverses the backup state of the metadata to determine which data records need to be copied. At step 610, the corresponding point-in-time backup records are written. The process completes at END step 612.

Extent backup can be performed by starting the traversal process at an offset into the LSA and stopping it before reaching the end. Extent backups performed this way will have the desired property that they will stand alone and not reference any data not contained in the backup even if the original data in the LSA in the extent backed up contained snapshots of data outside the backup extent.

Full and incremental backups of part of the LSA are guaranteed to fit back into the space that they previously occupied when restored provided the original data did not contain snapshots of data outside the backup extent. Backups of data containing snapshots of data outside the backup extent will cause those snapshots to diverge on restoration which will require extra free space to be available for restoration to be successful.

Full and incremental backups of the entire LSA are guaranteed to fit back onto the LSA as in this case there is no possibility of snapshots within the backup extent referencing data outside the backup extent.

Snapshot of the track data area can essentially be decomposed into a duplication of one part of the metadata associated with it (the upper tier of the two-tier LSA directory) and incrementing the reference counts in another part (the lower tier). It is not really necessary to know the exact reference count of a track in an LSA; it is only necessary to know when the reference count drops to zero so that the track can be freed.

In a system of iterated LSA levels, duplication of metadata is the same as asking the next lower LSA instance to carry out a snapshot operation and once this has been performed, the required reference count information can be obtained without incrementing the reference counts in the lower tier of the directory but instead by taking into consideration the reference count of the track belonging to the LSA level below which contains the upper tier of the directory for the current LSA level.

Thus a large snapshot can be propagated down the stack of LSA instances and converted into a much smaller snapshot operation for a lower level and very much less work needs to be done.

A snapshot can only be propagated down a level if it covers an extent large enough to cover a whole track worth of metadata and is correctly aligned otherwise it must be performed like a conventional LSA snapshot. This means that in general each level of the stack will perform a small amount of conventional snapshotting for incorrectly aligned bits of the snapshot at the beginning and end of the extent and pass the middle portion down to be performed more efficiently by the level below. This amounts to a logarithmic scaling of the amount of work with the size of the extent.

In a refinement of the iterative LSA of the preferred embodiment, it is possible to implement deduplication for arbitrary non-zero data as well as for all-zeros data.

This form of deduplication may be incorporated into the nested LSA scheme by reserving an extent of the underlying metadata address space for a b-tree of track hashes and using that to determine whether a track is a duplicate, choosing to either implement a write for non-duplicates or a track snapshot for duplicates when the track is written.

The nested LSA implementation of the preferred embodiment requires write caching at each level for performance, and so the data deduplication operation can be performed off the critical path by doing it on cache destage rather than when the write arrives.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In one alternative, the preferred embodiment of the present invention may be realized in the form of a computer implemented method of deploying a service comprising steps of deploying computer program code operable to, when deployed into a computer infrastructure and executed thereon, cause said computer system to perform all the steps of the method.

In a further alternative, the preferred embodiment of the present invention may be realized in the form of data carrier having functional data thereon, said functional data comprising functional computer data structures to, when loaded into a computer system and operated upon thereby, enable said computer system to perform all the steps of the method.

It will be clear to one skilled in the art that many improvements and modifications can be made to the foregoing exemplary embodiment without departing from the scope of the present invention.

The invention claimed is:

1. A system in communication with data storage, for storing data, and comprising:
    a first log structured data storage area storing data in a storage device, wherein the first log structured data storage area includes a first portion of a segment data area in the storage device to store user data;
    a first log structured data storage system operable with the first log structured data area to store the data in the first log structured data area;
    a second log structured storage area in the storage device storing metadata for the data in the first log structured data storage area, wherein the second log structured data storage area for storing the metadata is nested within the first log structured data storage area, and wherein the second log structured data storage area includes a track data area and a second portion of the segment data area to provide a virtual track data area in which the second log structured storage system allocates the physical storage to store the metadata for the data; and
    a second log structured storage system operable with the second log structured storage area, wherein the second log structured storage system allocates address space in the second log structured storage area for the metadata on demand when the first log structured storage system requires the allocation of address space for metadata for data the first log structured storage system stored in the first log structured storage area.

2. The system of claim 1, further comprising a third log structured data storage area for storing further metadata of the second log structured data storage system, wherein the third log structured data storage area is nested within the second log structured data storage area.

3. The system of claim 1, wherein unused metadata is recognizable patterned data.

4. The system of claim 3, wherein the unused metadata comprises an all-zeroes pattern or wherein the unused metadata comprises an all-ones pattern.

5. The system of claim 1, further comprising a compression component for compressing the metadata before writing.

6. The system of claim 1, further comprising a snapshot component for taking a snapshot copy of the metadata in the second storage area.

7. The system of claim 1, further comprising a data deduplication component comprising:
    a hashing component for creating and storing a hash value of a data entity;
    a comparator for comparing hash values of a pair of data entities; and
    a write control component responsive to an output of said comparator for selectively writing a non-duplicate data entity and for creating a snapshot of a duplicate data entity.

8. The system of claim 7, further comprising a write cache component, and wherein said data deduplication component is operable during a cache destage.

9. The system of claim 1, wherein the storage device further includes a first portion of a superblock area used by the first log structured data storage system and a second portion of the superblock area used by the second log structured data storage system to provide the virtual track data area.

10. A system in communication with data storage, for storing data, and comprising:
    a first log structured data storage area storing data in a storage device;
    a first log structured data storage system operable with the first log structured data area to store the data in the first log structured data area;
    a second log structured storage area in the storage device storing metadata for the data in the first log structured data storage area, wherein the second log structured data storage area for storing the metadata is nested within the first log structured data storage area;
    a second log structured storage system operable with the second log structured storage area, wherein the second log structured storage system allocates address space in the second log structured storage area for the metadata on demand when the first log structured storage system requires the allocation of address space for metadata for data the first log structured storage system stored in the first log structured storage area;
    a divider sub-component to divide each log structured data storage area for storing metadata into a working half and a backup half;
    a first copier sub-component to copy the metadata from the working half to the backup half of each log structured data storage area for storing metadata;
    a determiner sub-component to determine for a record in the backup half of each log structured data storage area for storing metadata whether corresponding data in a log structured data area is to be copied; and
    a second copier sub-component to copy the data in the log structured data area in response to determining that the data in the log structured data area is to be copied.

11. A method, comprising:
    providing a first log structured data storage area storing data in a storage device, wherein the first log structured data storage area includes a first portion of a segment data area in the storage device to store user data;
    providing a first log structured data storage system operable with the first log structured data area to store the data in the first log structured data area;
    providing a second log structured storage area in the storage device storing metadata for the data in the first log structured data storage area, wherein the second log structured data storage area storing the metadata for the first log structured data storage system is nested within the first log structured data storage area, wherein the second log structured data storage area includes a track data area and a second portion of the segment data area to provide a virtual track data area in which the second log structured storage system allocates the physical storage to store the metadata for the data; and
    providing a second log structured storage system operable with the second log structured storage area, wherein the second log structured storage system allocates address space in the second log structured storage area for the metadata on demand when the first log structured storage system requires the allocation of address space for metadata for data the first log structured storage system stored in the first log structured storage area.

12. The method of claim 11, further comprising providing a third log structured data storage area for storing further metadata of the second log structured data storage system, wherein the third log structured data storage area is nested within the second log structured data storage area.

13. The method of claim 11, wherein unused metadata is recognizable patterned data.

14. The method of claim 13, wherein the unused metadata comprises an all-zeroes pattern or wherein the unused metadata comprises an all-ones pattern.

15. The method of claim 11, further comprising compressing the metadata before writing.

16. The method of claim 11, further comprising taking a snapshot copy of the metadata in the second storage area.

17. The method of claim 11, further comprising performing data deduplication by performing:
creating and storing a hash value of a data entity;
comparing hash values of a pair of data entities to determine whether the data entity is a duplicate; and
responsive to an output of comparing the hash values, selectively writing a non-duplicate data entity and creating a snapshot of a duplicate data entity.

18. The method of claim 17, further comprising performing write caching, and wherein the data deduplication is performed during a cache destage.

19. The computer readable storage medium of claim 11, further comprising taking a snapshot copy of the metadata in the second storage area.

20. The method of claim 11, wherein the storage device further includes a first portion of a superblock area used by the first log structured data storage system and a second portion of the superblock area used by the second log structured data storage system to provide the virtual track data area.

21. A method, comprising:
providing a first log structured data storage area storing data in a storage device;
providing a first log structured data storage system operable with the first log structured data area to store the data in the first log structured data area;
providing a second log structured storage area in the storage device storing metadata for the data in the first log structured data storage area, wherein the second log structured data storage area storing the metadata for the first log structured data storage system is nested within the first log structured data storage area;
providing a second log structured storage system operable with the second log structured storage area, wherein the second log structured storage system allocates address space in the second log structured storage area for the metadata on demand when the first log structured storage system requires the allocation of address space for metadata for data the first log structured storage system stored in the first log structured storage area;
dividing each log structured data storage area for storing metadata into a working half and a backup half;
copying the metadata from the working half to the backup half of each log structured data storage area for storing metadata;
determining for a record in the backup half of each log structured data storage area for storing metadata whether corresponding data in a log structured data area is to be copied; and
copy the data in the log structured data area in response to determining that the data in the log structured data area is to be copied.

22. tangible computer readable storage device including a computer program, that when loaded into a computer system and executed thereon, causes the computer system to communicate
with a storage device and to perform operations, the operations comprising:
providing a first log structured data storage area storing data in the storage device, wherein the first log structured data storage area includes a first portion of a segment data area in the storage device to store user data; providing a first log structured data storage system operable with the first log structured data area to store the data in the first log structured data area;
providing a second log structured data storage area storing metadata for the data in the first log structured data storage area, wherein the second log structured data storage area storing the metadata for the first log structured data storage system is nested within the first log structured data storage area, wherein the second log structured data storage area includes a track data area and a second portion of the segment data area to provide a virtual track data area in which the second log structured storage system allocates the physical storage to store the metadata for the data; and
Providing a second log structured storage system operable with the second log structured storage area, wherein the second log structured storage system allocates address space in the second log structured storage area for the metadata on demand when the first log structured storage system requires the allocation of address space for metadata for data the first log structured storage system stored in the first log structured storage area.

23. The computer storage readable medium of claim 22, wherein the operations further comprise:
providing a third log structured data storage area for storing further metadata of the second log structured data storage system, wherein the third log structured data storage area is nested within the second log structured data storage area.

24. The computer readable storage medium of claim 22, wherein unused metadata is recognizable patterned data.

25. The computer readable storage medium of claim 22, wherein the operations further comprise compressing the metadata before writing.

26. The computer storage readable medium of claim 22, further comprising performing data deduplication by performing:
creating and storing a hash value of a data entity;
comparing hash values of a pair of data entities to determine whether the data entity is a duplicate; and
responsive to an output of comparing the hash values, selectively writing a non-duplicate data entity and creating a snapshot of a duplicate data entity.

27. The computer storage readable medium of claim 22, wherein the storage device further includes a first portion of a superblock area used by the first log structured data storage system and a second portion of the superblock area used by the second log structured data storage system to provide the virtual track data area.

28. A tangible computer readable storage device including a computer program, that when loaded into a computer system and executed thereon, causes the computer system to communicate with a storage device and to perform operations, the operations comprising:

provoking a first log structured data storage area storing data in the storage device; providing a first log structured data storage system operable with the first log structured data area to store the data in the first log structured data area; providing a second log structured data storage area storing metadata for the data in the first log structured data storage area, wherein the second log structured data storage area storing the metadata for the first log structured data storage system is nested within the first log structured data storage area; providing a second log structured storage system operable with the second log structured storage area, wherein the second log structured storage system allocates address space in the second log structured storage area for the metadata on demand when the first log structured storage system requires the allocation of address space for metadata for data the first log structured storage system stored in the first log structured storage area; dividing each log structured data storage area for storing metadata into a working half and a backup half;

copying the metadata from the working half to the backup half of each log structured data storage area for storing metadata;

determining for a record in the backup half of each log structured data storage area for storing metadata whether corresponding data in a log structured data area is to be copied; and copy the data in the log structured data area in response to determining that the data in the log structured data area is to be copied.

* * * * *